Dec. 17, 1946.    A. F. KALMAR    2,412,686
PROCESS OF COATING FRUIT
Filed Feb. 1, 1943    2 Sheets-Sheet 2

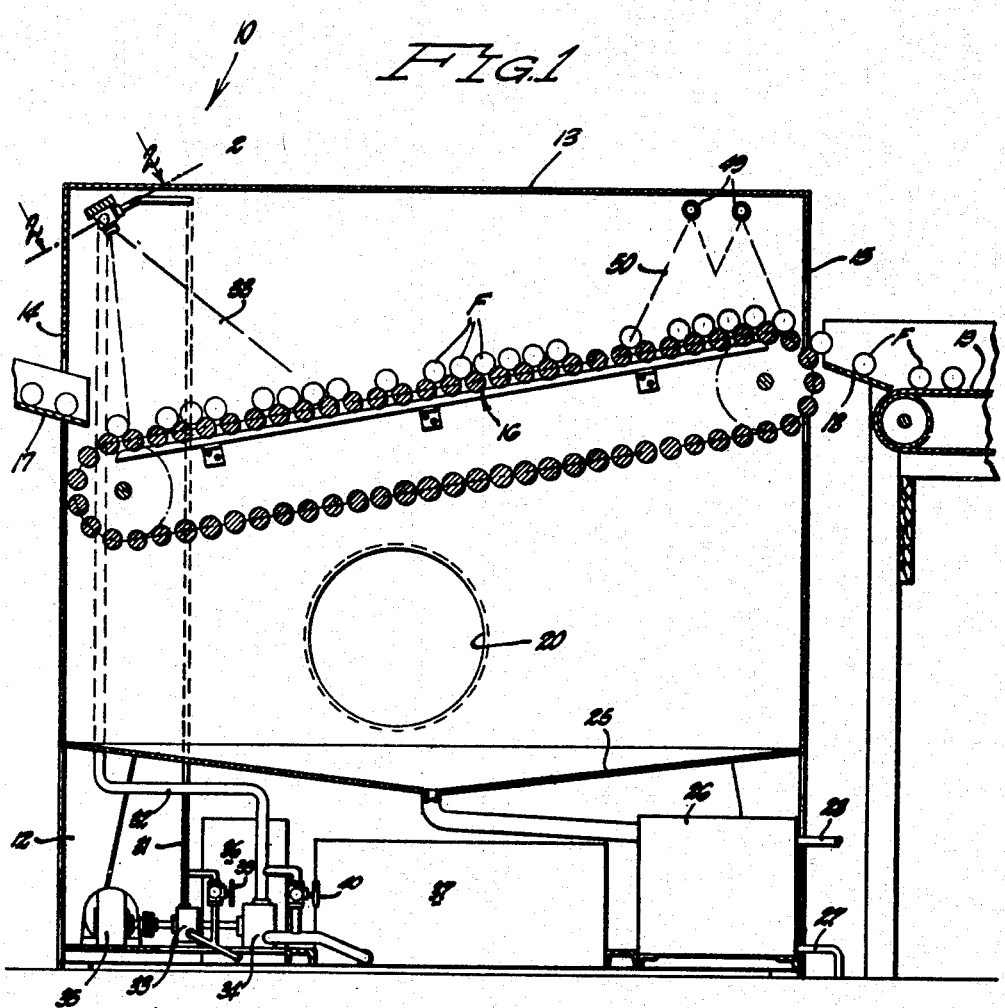

INVENTOR:
ARTHUR F. KALMAR
BY
ATTORNEY

Patented Dec. 17, 1946

2,412,686

UNITED STATES PATENT OFFICE 2,412,686

PROCESS OF COATING FRUIT

Arthur F. Kalmar, Riverside, Calif., assignor to Food Machinery Corporation, San Jose, Calif., a corporation of Delaware Application February 1, 1943, Serial No. 474,289

10 Claims. (Cl. 99—168)

This invention relates to the art of commercially preparing fresh whole fruit for shipment to market, and has a special utility in the coating of citrus fruit for preserving its freshness and improving its appearance. While it is to be understood, therefore, that the process of my invention is applicable to a wide variety of fresh fruits and vegetables, it will, for illustrative purposes, be described herein as applied in the coating of citrus fruits.

The fact that citrus fruit often accumulates considerable surface dirt while on the tree, and the necessity for maintaining high standards of cleanliness in the fruit when it reaches market, has made it necessary to uniformly wash all citrus fruit in preparing it for shipment. This tends to leach out a certain amount of the rind oils and waxes which nature provides for protecting the fruit against shrinkage. It has been found desirable, therefore, to add a certain amount of waxy material to the fruit rind after it has been washed and before it is packed, to restore the fruit's ability to resist shrinkage during the considerable period which elapses between its being shipped and its ultimate consumption.

Many different processes have been developed for accomplishing this coating of the fruit. Experience has shown that great care must be taken to avoid damaging the fruit by the process itself, or by the application of such a heavy coating as to form an air-tight enclosure about the fruit which would prevent its breathing and cause anaerobic respiration and the development of undesirable flavors.

It is an object of this invention to provide a simple method of coating fresh whole fruit which will not form an air-tight enclosure, but which will accomplish a satisfactory degree of shrinkage control.

One of the processes heretofore developed for coating fruit, the so-called "spray-wax" process disclosed in the Sharma Patent No. 2,212,621, issued August 27, 1940, is at present widely used in the citrus producing areas of the United States. In that process a clear solution of the waxy material in a volatile organic solvent is applied in a fine spray to the fruit. Only a very limited amount of the solution is thus applied to the fruit, and the fruit is then allowed to dry without brushing. The solvent is thus used as a vehicle to deposit a very small but sufficient quantity of waxy material onto the rind of the fruit without the fruit being burned by the solvent.

In practicing the spray wax process it has been discovered that the spraying of the solution through the atmosphere onto the fruit gets the best results when this is accomplished with a spray, the particles of which are not too finely divided and in a manner to convey the spray particles rapidly into contact with the fruit after they are formed. This is explained by the fact that under the conditions mentioned, the solution suffers a minimum of evaporation on its way through the air to contact the fruit. Being relatively dilute and of a low viscosity when striking the fruit surface, the solution particles spread over relatively extensive areas. This apparently builds a more effective coating with a given quantity of solution than where substantial evaporation of the solvent is allowed to take place before the solution contacts the fruit.

Nevertheless, it is estimated that when performing the spray wax method under the best conditions developed to date, there is a loss by evaporation of as much as 50% of the solvent in the solution particles while they are traveling through the air.

It is an object of my invention to provide a process of coating fruit with a solution of waxy material in a volatile organic solvent in which evaporation of the solvent from the solution prior to deposit of the latter on the fruit surface is greatly decreased over that which is tolerated in the most efficient operation to date of the so-called spray-wax method.

By accomplishing this object, I shall be able to secure the same degree of shrinkage control with much less solvent. As the solvent used is the greatest single item of expense, it is a further object of my invention to provide a process of coating fruit with a solution similar to that used in the spray wax process in which substantial economies are effected in the amount of solvent consumed.

The process of my invention contemplates the application of a dilute solution of waxy material in a water-immiscible volatile organic solvent in dispersed form so that the waxy material deposited from the respective particles of solution contacting the fruit comprise a series of slightly spaced or overlapping patches or spots. The final coating thus applied to the fruit does not form a continuous envelope about the fruit, although the microscopically thin spots of wax may overlap each other.

This coating may be characterized as a network of patches or specks of waxy material or as a stippled coating or as a cumulative spotting of waxy material. The modus operandi of my process is to apply the solution of waxy material to the fruit by forming a temporary aqueous emulsion in which said solution comprises the dispersed phase. This emulsion is applied while in a highly agitated or dispersed state to the fruit surface, after which the fruit is allowed to dry with or without the excess emulsion applied thereto being first rinsed therefrom.

When the temporary emulsion of my process is thus applied, the dispersed globules of wax solution, having an affinity for the organophilic surface of the fruit, preferentially wets the surface immediately and displaces practically all the water with which the fruit surface may have become wet, either by the emulsion itself or by a previous washing operation. This action is so rapid that only a few seconds delay is necessary for the consummation of the coating of the fruit between the application of the emulsion and the rinsing of the excess of the latter from the fruit, if a rinse is found desirable.

The rinse water is unable to replace the solution directly in contact with the fruit surface after the emulsion has thus been applied to the latter, but it can remove the excess emulsion including the excess waxy solution present on the surface of the fruit. Control of the time interval between the application of the emulsion and the water rinse may be employed to control the amount of solution allowed to remain on the fruit as a result of the treatment, which naturally determines the amount of wax deposited and the degree of shrinkage control accomplished.

Where the rinse is not used, the degree of shrinkage control is determined largely by the extent of contact permitted between the emulsion and the fruit, and by the amount of waxy material dissolved in the solvent to form the coating solution. The temporary character of the emulsion and the necessity for agitating this to keep the solution in dispersed form therein just prior to the time it contacts the fruit, makes it preferable to apply the emulsion to the fruit by flooding or spraying rather than by immersion.

After the application of the emulsion to the fruit, and whether or not the latter is rinsed following this application, the fruit is preferably allowed to dry without being brushed or rubbed.

By virtue of the fruit surface being substantially covered by the waxy material deposited thereon from the emulsion, the particles of water which remain on the fruit following the treatment with the emulsion or the rinse, are in the form of small droplets or beads located, for the most part, at the small areas where the dispersed globules of wax solution in the emulsion have not made contact with the fruit. The drying of the fruit following this treatment by my process is thus a fairly simple matter, as this water may readily be blown from the surface of the fruit or absorbed therefrom by an absorbent roll drier.

To illustrate the performance of the process of my invention, a preferred form of apparatus is shown in the accompanying drawings in which:

Fig. 1 is a diagrammatic illustration of a wax applicator suitable for performing the process of my invention.

Fig. 2 is a diagrammatic sectional view taken on the line 2—2 of Fig. 1 of a mixing nozzle suitable for use in the applicator of my invention.

Fig. 3 is a sectional view taken on the line 3—3 of Fig. 2.

Figure 4:
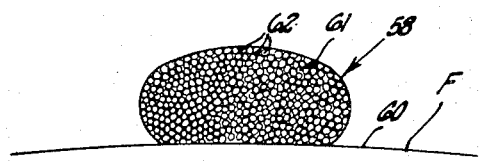
Fig. 4 is a greatly enlarged diagrammatic sectional view illustrating an emulsion particle at the instant of its contacting an upwardly disposed surface of a piece of fruit in accordance with my invention.
Figure 9:
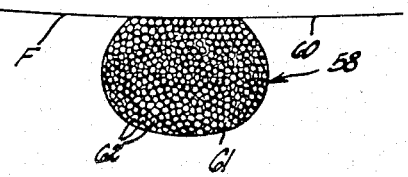
Figs. 9, 10, 11 and 12 are similar to Fig. 4 and show successive stages of the contact of an emulsion particle with a downwardly disposed surface of the fruit and the subsequent delivery of the dispersed phase from said particle into intimate contact with the rind of the fruit.
Figure 5:
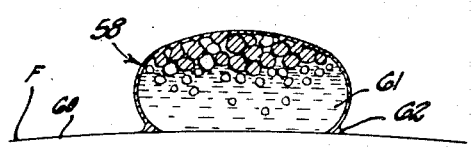
Figs. 5, 6, 7 and 8 are views similar to Fig. 4 and show successive stages immediately following that shown in Fig. 4 in which the dispersed phase in said particle of emulsion is delivered into intimate contact with the surface of the fruit.
Figure 10:
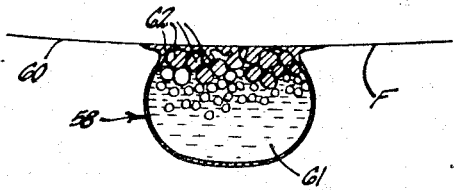
Figure 6:
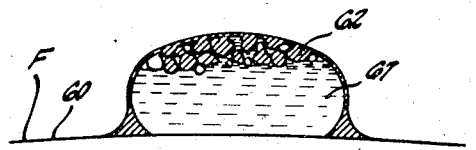
Figure 11:
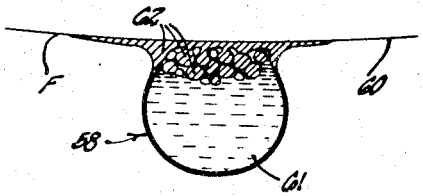
Figure 7:
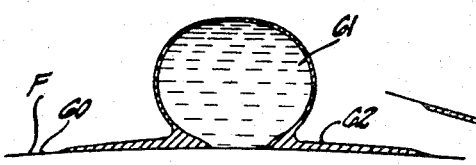
Figure 12:
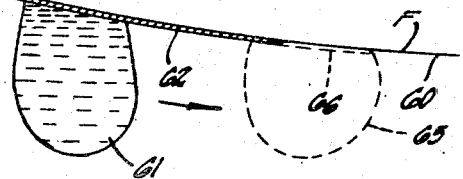
Figure 8:
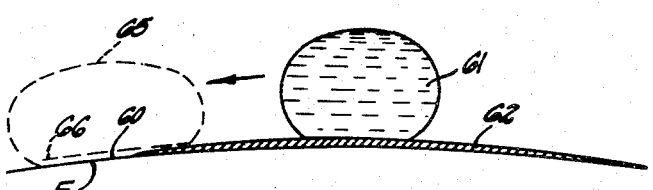

The applicator 10 shown in the drawings includes a frame 12, on which is provided a housing 13 having doors 14 and 15, and an inclined rotating roller conveyor 16 for receiving fruit F entering the door 14 and conveying it across the housing 13 while rotating said fruit, and discharging it through the door 15. A delivery board 17 is provided for delivering fruit through the door 14 onto the conveyor 16, and a board 18 delivers fruit discharged through the door 15 onto a conveyor 19. A suitable blower (not shown) is provided for evacuating air from the lower portion of the housing 13 below the conveyor 16 through a pipe 20. The housing 13 has a bottom 25 which drains into a separating tank 26 having a water outlet 27 and a solution outlet 28.

Mounted in the housing 13 above the conveyor 16 is a nozzle 30 which is supplied through pipes 31 and 32 leading from pumps 33 and 34 driven by a motor 35, with two liquids, Liquid A and Liquid B. These liquids are drawn from tanks 36 and 37 respectively, and are thoroughly mixed in the nozzle 30 and delivered therefrom in a continuous spray 38. Bypass valves 39 and 40 are provided for manually controlling the proportionate amounts of Liquid A and Liquid B contained in this mixture.

The nozzle 30 may be any suitable two-liquid-mixing spray nozzle, but is shown herein as having a central mixing chamber 44, into which Liquid A is injected through a passage 45 and Liquid B through passage 46. The tangential relation of passage 46 causes a rapid swirling and mixing of the two liquids in the form of a temporary emulsion which is then expelled through a spray orifice 47 to produce the emulsion spray 38.

Also provided in the upper portion of the housing 13 is a pair of spray pipes 49, which are supplied with tap water to form and direct rinse sprays 50 downwardly onto the fruit carried on the conveyor 16 after this has passed through the spray 38 and then travelled for several seconds at least on the conveyor.

Before starting the applicator 10 to perform the process of my invention, the tanks 36 and 37 must be supplied with Liquid A and Liquid B, respectively.

Liquid A comprises a solution of waxy material the solvent in which is a water-immiscible highly volatile, organic solvent preferably such as that made by the Shell Oil Company and known on the market as "Rubber Solvent A." The latter solvent is a petroleum distillate having a distillation range of from 173° F. to 222° F. When waxy materials are employed in Liquid A which have a relatively high rate of solvent release, a heavier solvent may be employed such as "Lacquer Diluent C," another petroleum distillate product of the Shell Oil Company, having a distillation range of from 214° F. to 306° F. Generally speaking, the distillation range of at least 95% of this solvent should preferably be within the limits of 100° F. to 350° F.

To show what is meant herein by the term "volatile," it is noted that when Rubber Solvent A is subjected to the Du Pont Fan and Turntable Method Test, using 5 cc. samples with a room temperature of 87° Fahrenheit, evaporation is effected in 11.5 minutes. When subjected to the same test, Lacquer Diluent C evaporates in 30 minutes. In the same test High-Flash naphtha requires 280 minutes for evaporation, and a typical kerosene requires 600 minutes.

The waxy material contained in Liquid A may be paraffin wax preferably in an amount varying from about 2% to about 7% of the weight of the solvent. It is to be understood, however, that any of the waxes or waxlike materials, both natural and synthetic, which may be applied in the spray wax method aforesaid, are equally suitable for application to the fruit in the solution of Liquid A in the process of my invention. While it is preferably to use a small percentage of paraffin in this solution because of the relatively slow rate at which it releases the solvent after being deposited on the fruit, it is to be understood that a larger proportion of the waxy material may be used in this solution where the waxy material is one having a higher rate of solvent release than paraffin.

It is also preferable, although not essential, that either Liquid A or Liquid B contain an emulsifying agent which may be a synthetic emulsifier, such as dioctyl sodium sulfosuccinate (Aerosol OT), or any other suitable equivalent. Where an emulsifying agent is used in Liquid A, it should be compatible with the waxy material contained therein.

Liquid B may be tap water and it may have dissolved therein a secondary coating material such, for instance, as shellac saponified with triethanolamine, ammonium hydroxide, or some other weak alkali. To hasten the drying of the shellac a small amount of acetone may be added.

One purpose of thus using shellac is to enhance the appearance of the fruit by increasing its capacity for reflecting light. This is merely additive, of course, to the brightness given the fruit by the paraffin or other waxy material contained in Liquid A. Where a satisfactory brightness is accomplished by the waxy material in Liquid A, the shellac may be omitted from Liquid B. Where saponified shellac is contained in Liquid B, this also acts as an emulsifying agent. Suitable formulas for Liquids A and B are as follows:

Liquid A

| Ingredient | Percent |
|---|---|
| Petroleum solvent | 80–99 |
| Waxy material | 1–20 |
| Emulsifying agent | 0– 0.25 |

Liquid B

| Ingredient | Percent |
|---|---|
| Water | 74.55–100.0 |
| Emulsifying agent | 0.0 – 0.25 |
| Bleached shellac | 0.0 – 5.0 |
| Saponifying agent | 0.0 – 0.2 |
| Acetone | 0.0 – 20.0 |

The ratio of Liquid A to Liquid B in the temporary emulsion should be within the limits of 1 part Liquid A with 99 parts Liquid B to 20 parts Liquid A with 80 parts Liquid B.

With the tanks 36 and 37 charged with Liquids A and B, the prime movers for driving the various movable parts of the applicator 10 are energized so that the conveyors 16 and 19 are set in motion; air is evacuated from the housing 13 through the pipe 20; the immiscible Liquids A and B are pumped through pipes 31 and 32 into the nozzle 30, where they are thoroughly mixed and discharged in the form of a spray cone 38 of temporary emulsion; and fresh water is supplied to pipes 49 to produce rinse sprays 50. The proportionate amounts of Liquids A and B thus mixed to form this emulsion are determined by manual manipulation of the by-pass valves 39 and 40.

Fruit F is now fed over the delivery board 17 into the applicator 10, this fruit being rotated and conveyed upwardly through the spray 38. The fruit is thus covered with coarse particles of the temporary emulsion formed by mixing Liquids A and B in nozzle 30. These particles are delivered onto the upwardly exposed surfaces of the pieces of fruit while the latter rest on and are rotated by the conveyor 16. Thus the entire surface of each piece of fruit becomes coated with emulsion particles.

Up until the time these emulsion particles contact the surfaces of the fruit F, the solution of waxy material comprising Liquid A is confined in the form of dispersed phase globules which are contained within and surrounded by the aqueous phase present in each of the emulsion particles. The solution phase is thus sealed off from the atmosphere and evaporation of the solvent from the solution prevented prior to its delivery right onto the fruit surface.

Immediately upon each of the emulsion particles contacting a piece of fruit it starts to break down, releasing the solution of waxy material contained in the dispersed phase, and the latter passes right into contact with the surface of the fruit on which the emulsion particle rests. The emulsion particle then starts to slide over the surface of the fruit and spreads out the deposited waxy solution to cover the area traversed by the emulsion particle until the waxy solution carried by this particle has been used up in the thin film thereof thus applied to the fruit surface. The balance of the emulsion particle which is then left comprises merely the aqueous continuous phase thereof.

When the aqueous or continuous phase is thus freed of the dispersed phase and the latter spread in a thin layer on the surface of the fruit, the droplet comprising the aqueous phase may continue to cling to a portion of the fruit surface not covered by the waxy solution, and if the fruit is not rinsed or dried mechanically these droplets will dry by evaporation. In such a case, if the aqueous phase contains any coating material such as a saponified shellac, the latter will be deposited on the fruit surface contacted by these droplets when the water in these evaporates.

The length of time required for the emulsion of my invention to break down after being applied to the fruit will depend upon many factors, including the relative specific gravities of the dispersed and continuous phases, the amount and character of any emulsifying agent contained therein, and the degree of violence with which the two phases are mixed to produce the emulsion.

Ordinarily, it is preferred to rinse the excess emulsion from the fruit with the water sprays 50, in which case the emulsion employed in my invention should be such a loose one, that is, of such a temporary or unstable nature that it will substantially completely break down and release almost all of its dispersed phase into contact with the fruit surface while the fruit is traveling between the emulsion spray cone 38 and the rinse spray cones 50 (see Fig. 1). Considering the normal maximum speed at which fruit is fed through the applicator 10 as being 120 rows a minute, it will be seen that six seconds is here allowed for this action to take place before the excess emulsion is rinsed from the fruit. In case it is not desired to use the rinse sprays in the applicator 10, however, a considerably longer period could be allowed for the breaking down of the emulsion and the consummation of the coating operation.

To illustrate approximately how the dispersed phase separates out from the particles of emulsion applied to the fruit and coats this fruit, Figs. 4, 5, 6, 7 and 8 represent highly enlarged views of such a particle adhering to an upwardly disposed surface of a piece of fruit F, and Figs. 9, 10, 11 and 12 similarly illustrate the breakdown of the two phases of an emulsion particle adhering to a downwardly disposed surface of a piece of fruit. In all these views the emulsion particle will be indicated by the reference numeral 58 as resting on a fruit surface 60, each particle including an aqueous continuous phase 61 and an organic dispersed phase 62.

Fig. 4 shows a particle 58 at the very instant it strikes the surface 60 of a piece of fruit F. Here we see the dispersed phase 62 fairly uniformly separated in small globules of uniform size, there being none of the dispersed phase at this time released from complete encirclement by the aqueous phase 61. This illustrates how the solution in the globules 62 is sealed in and the evaporation of solvent therefrom prevented prior to the solution being delivered directly onto the surface of the fruit.

Almost immediately, and preferably within a period of two seconds, the globules of the dispersed phase 62 commence coalescing as shown in Fig. 5, and break through the outer surface of the aqueous phase 61 to form a film surrounding the particle 58 and contacting the fruit surface 60. Fig. 6 illustrates the accelerated development of the delivery of the dispersed phase onto the fruit surface. In Fig. 7 the breakdown of the emulsion particle has been almost completed, the dispersed phase 62 spreading out over the fruit surface 60 and undercutting the droplet of aqueous phase 61 which still contacts a small area of the fruit surface. Fig. 8 illustrates the completion of the breakdown of the emulsion in the particle 58 with the dispersed phase 62 thereof spread out over the fruit surface F and the continuous phase 61 formed into an aqueous droplet which freely slides over the solution-coated surface of the fruit until this droplet either falls off the fruit or comes to rest, as indicated by broken lines 65, on a portion of the fruit surface 60 which is not coated with the solution 62. These droplets may be removed by the spray 50 or if the latter is not employed, may be allowed to evaporate so that any secondary coating material carried therein will be deposited on the fruit surface as indicated by the broken line 66.

The breakdown of an emulsion particle 58 adhering to a downwardly disposed fruit surface is very similar to that of a particle contacting an upwardly disposed surface, excepting that the coalescing of the globules of the dispersed phase 62 and delivery of these onto the fruit surface 60, is accomplished considerably more rapidly because the natural tendency of these globules is to rise Where Liquid B is merely tap water it is preferable to remove the aqueous droplets of continuous phase 61 mechanically from the surface 60 of the fruit F, in which case the fruit may be delivered by the conveyor 19 to a suitable drier for accomplishing this. As already stated, it is optional, depending upon the way the process is to be employed, as to whether or not the excess emulsion is rinsed from the fruit in the applicator 10. In any event, the spots of solution 62 which are applied to the fruit surface 60, or that portion of it which is allowed to remain on the fruit by the degree with which the rinse sprays 50 operate to remove the excess emulsion, is allowed to remain undisturbed as by brushing or rubbing until the solvent has had an opportunity to evaporate from this solution, leaving the fruit rind substantially covered by a multiplicity of spots of waxy material.

Should additional coating material be contained in Liquid B, such for instance, as saponified shellac, this will be deposited on the fruit surface 60 only where the latter is not covered with a spot of waxy material left by the waxy solution 62.

The fumes created by the evaporation of solvent in the housing 11 are conducted away through the exhaust pipe 20, these fumes being preferably discharged at some point outside the building in which the apparatus 10 is installed. The liquid ingredients of the emulsion and of the rinse spray which drip downwardly through conveyor 16, are caught by the housing bottom 25 and drain into the tank 26, where they are separated, the aqueous portion of this mixture being drawn off through the pipe 27 and the solvent-containing portion of this mixture being drawn off through the pipe 28.

In order to clearly distinguish the process of my invention from fruit coating processes of the prior art, it is pointed out that the coating of fruit has been previously accomplished by what are known as water waxes, in which the fruit is contacted with an aqueous emulsion and in which the dispersed phase contains the coating material. In all of these water waxes, however, of which I have knowledge, the emulsion had to be highly stable, as the coating of the fruit was accomplished by dipping the fruit in the water wax or flooding the latter on the fruit, and the surface tension of the water wax had to be reduced to the point where it would thoroughly wet the fruit and form a thin film of the water wax completely enveloping the fruit. The fruit was then removed from the water wax and the water allowed to evaporate from this thin film until the coating material contained in the dispersed phase was finally left deposited on the fruit. It is thus seen that whereas instability of the emulsion of my invention is a very important characteristic thereof, the stability of water wax emulsions is an all-important factor in the coating of fruit by water wax.

The word "temporary," when used in the claims to describe the emulsion employed in my method, may be taken to mean a highly unstable oil-in-water emulsion which "breaks" practically immediately upon contacting the fruit whereby the oil phase separates from the emulsion and is brought into intimate contact with the organophilic fruit surface thereby freeing the water phase and leaving the oil phase adhering to the fruit surface.

I am also aware that certain prior patents disclose the idea of applying waxy material to fruit with this material dissolved in kerosene or naphtha and contained in an aqueous emulsion. In that process the solvent was not volatile in the sense that the solvent in my process must be, in order to form a suitable coating for the fruit. Instead, the mixture of kerosene and wax had to be brushed to thin it out over the surface of the fruit after it had been applied. This process was unsuccessful commercially, because of the burning of the fruit by the kerosene and because the process produced a continuous envelope sealing up the fruit and thereby preventing the respiration of the latter, which is essential to maintaining its natural flavor while on its way to market.

From the foregoing, it is believed clear that I have provided a novel and highly practical process for coating fresh whole fruits so as to control the shrinkage rate of these, or enhance the appearance of the fruit, or both.

It is also believed clear that I am able, by the process of my invention, to utilize a water immiscible volatile organic solvent as a medium for applying waxy material to the surface of fresh whole fruit in a manner to prevent evaporation of the solvent prior to the solution formed therewith actually contacting the surface of the fruit. A substantial saving in the amount of solvent required to perform this function is thus effected, while retaining the benefits of applying the wax with a volatile solvent as a medium.

While I have indicated certain ingredients and steps as preferable for the performance of the process of my invention in the coating of citrus fruit, it is to be understood that this process may be used in coating various other fruits and vegetables and that the steps described may be varied and other ingredients substituted for those mentioned, without departing from the spirit of the invention or the scope of the appended claims.

I claim:

1. A method of coating fresh fruit which consists in forming a solution of waxy material in a volatile petroleum distillate solvent which is immiscible with water, mixing said solution with an aqueous medium in the presence of an emulsifying agent to form a temporary emulsion, and applying said emulsion to said fruit said emulsion breaking rapidly so as to release said waxy solution and cause the latter to spread over said fruit.

2. A method of coating fresh fruit which consists in forming a solution of waxy material in a volatile petroleum distillate solvent which is immiscible with water, mixing said solution with an aqueous medium to form a temporary emulsion, and applying said emulsion in dispersed form to said fruit said emulsion breaking rapidly so as to release said waxy solution and cause the latter to spread over said fruit.

3. A method of coating fresh fruit which consists in forming a solution of waxy material in a volatile petroleum distillate solvent which is immiscible with water, mixing said solution with an aqueous medium to form a temporary emulsion, applying said emulsion to said fruit, said emulsion breaking rapidly so as to release said waxy solution and cause the latter to spread over said fruit and rinsing the excess emulsion from said fruit.

4. A method of coating fresh fruit, which consists in forming a solution of waxy material in a volatile petroleum distillate solvent which is immiscible with water, continuously mixing said solution with an aqueous medium in the presence of an emulsifying agent in proportions suitable for the formation of a temporary emulsion, with said solution in the dispersed phase, and applying said emulsion to the fruit immediately after it is thus formed said emulsion breaking rapidly so as to release said waxy solution and cause the latter to spread over said fruit.

5. A method of coating fresh fruit, which consists in forming a solution of waxy material in a volatile petroleum distillate solvent which is immiscible with water, continuously mixing said solution with an aqueous medium in the presence of an emulsifying agent in proportions suitable for the formation of a temporary emulsion, with said solution in the dispersed phase, and applying said emulsion to the fruit immediately after it is thus formed by spraying said emulsion on said fruit said emulsion breaking rapidly so as to release said waxy solution and cause the latter to spread over said fruit.

6. A method of coating fresh fruit, which consists in forming a solution of waxy material in a volatile petroleum distillate solvent which is immiscible with water, continuously mixing said solution with an aqueous medium in the presence of an emulsifying agent in proportions suitable for the formation of a temporary emulsion with said solution in the dispersed phase, applying said emulsion to the fruit immediately after it is thus formed by spraying said emulsion on said fruit, said emulsion breaking rapidly so as to release said waxy solution and cause the latter to spread over said fruit and rinsing the excess emulsion from said fruit.

7. A method of coating fresh fruit which consists in forming a solution of waxy material in a volatile petroleum distillate solvent which is immiscible with water, mixing a saponified shellac with an aqueous medium, and mixing the solution aforesaid with said aqueous medium to form a temporary emulsion, and applying said emulsion to said fruit said emulsion breaking rapidly so as to release said waxy solution and cause the latter to spread over said fruit.

8. A method of coating fresh fruit, which consists in forming a solution of waxy material in a volatile petroleum distillate solvent which is immiscible with water, continuously delivering a stream of said solution and a stream of an aqueous medium into intimate contact with each other, in a proportion suitable for the formation of a temporary emulsion, with sufficient violence to produce a temporary emulsion and discharging said temporary emulsion, as it is thus formed, in a spray against said fruit.

9. A method of coating fresh fruit, which consists in forming a solution of waxy material in a volatile petroleum distillate solvent which is immiscible with water, discharging a stream of said solution and a stream of an aqueous medium continuously into a confined space with sufficient violence to produce an emulsion and releasing said emulsion as it is thus produced in the form of a spray directed against said fruit.

10. A method of coating fresh fruit which consists in forming a solution of waxy material in a volatile petroleum distillate solvent which is immiscible with water, mixing said solution with an aqueous medium to form a temporary emulsion and applying said emulsion to said fruit.

ARTHUR F. KALMAR.